US006366857B1

United States Patent
Bird et al.

(10) Patent No.: US 6,366,857 B1
(45) Date of Patent: Apr. 2, 2002

(54) NOISE ESTIMATOR FOR SEISMIC EXPLORATION

(75) Inventors: David G. Bird, Greensboro, NC (US); Harold L. Longaker, Houston, TX (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/340,274

(22) Filed: Jun. 25, 1999

(51) Int. Cl.$^7$ ............................................. G06F 19/00
(52) U.S. Cl. ............................................. 702/2; 702/17
(58) Field of Search ........................ 702/17, 2; 367/45, 367/59, 40, 41, 39; 455/226; 73/613, 602; 327/552, 553, 555

(56) References Cited

U.S. PATENT DOCUMENTS

| | | | |
|---|---|---|---|
| 4,592,031 A | 5/1986 | Bradshaw et al. ............. | 367/45 |
| 4,715,021 A | * 12/1987 | Dittert ........................... | 367/41 |
| 4,926,392 A | * 5/1990 | Handley et al. ............... | 367/59 |
| 5,241,513 A | * 8/1993 | Kerekes et al. ................ | 367/39 |
| 5,991,235 A | * 11/1999 | Allen .......................... | 367/40 |

OTHER PUBLICATIONS

H. Justus Rozemond, "Slip–sweep acquisition", SEG International Exposition and Sixty–Sixth Annual Meeting, 1996 Technical Program, vol. 1, pps. 64–67.
Jan Wams and Justus Rozemond, "Recent developments in 3–D acquisition techiques using vibroseis in Oman," The Leading Edge, Aug. 1998, 9 pages.

* cited by examiner

Primary Examiner—Jay Patidar
Assistant Examiner—Victor J. Taylor
(74) Attorney, Agent, or Firm—Blakely, Sokoloff, Taylor & Zafman LLP (57) ABSTRACT

A method of generating a noise estimate during seismic surveying, including measuring noise energy having a plurality of frequencies in a second time interval. The second time interval having a second start time delayed from a first start time of a first time interval during which a first plurality of reflected seismic signals are present. The plurality of reflected seismic signals having the plurality of frequencies. The second time interval approximately concurrent with the first time interval to measure one of the plurality of frequencies of the noise energy different than one of the plurality of frequencies of the first plurality of reflected seismic signals that are present. A noise estimate is generated based on the noise energy measured.

22 Claims, 10 Drawing Sheets

NOISE ESTIMATOR FOR SEISMIC EXPLORATION

FIELD OF THE INVENTION

This invention relates to the field of seismic exploration and, more specifically, to a method and apparatus for noise estimation in seismic surveying.

BACKGROUND

In seismic surveying, acoustic energy waves are transmitted into the earth in order to map subterranean geological structures by sensing returned acoustic energy waves reflected from those geological structures. Land seismic surveys are commonly performed using vibroseis trucks that provide the source of the acoustic energy. The vibroseis trucks generate ("vibrate") the acoustic energy waves at predetermined vibrator points ("VP") that are usually marked with stakes that have been placed by surveyors. During operations, the vibroseis trucks navigate from point to point using these survey stakes.

The acoustic energy wave, known as a chirp sweep, vibrated by the trucks is swept in frequency over a period of time. A typical chirp may sweep from 5 to 150 Hertz (Hz) and last for 15 seconds. The subterranean geological layers create changes in the chirp due to refractions, reflections, and diffractions at the boundaries of changes in acoustic impedance of each subterranean layer. Some of these altered acoustic energy waves, known as echoes, return to the earth's surface to be sensed by seismic detectors. The arrival time of the echoes at the seismic detectors depends mainly on the depth of the subterranean layers reflecting the chirp. A listening time window is used to capture the return echoes down to the depth of interest. The echoes are compressed by correlating with the chirp sweep. The arrival times of the compressed echoes are used to generate imaging data of the subterranean structure.

One problem with seismic surveying operations is that the presence of ambient noise during the listening time window may drown out the echoes to be sensed by the seismic detectors. Ambient noise may be generated by sources in the area being surveyed such as wind tugging on grass or vehicular traffic. The imaging data process requires a minimum signal-to-noise ratio (SNR) for the data to be of sufficient quality for surveying use. If the ambient noise level is too high, then surveying operations may have to be halted until the ambient noise level falls to an acceptable SNR level. As such, in order to obtain an in-field estimate of the data quality, a passive measurement of the ambient noise level is made.

Figure 1A:
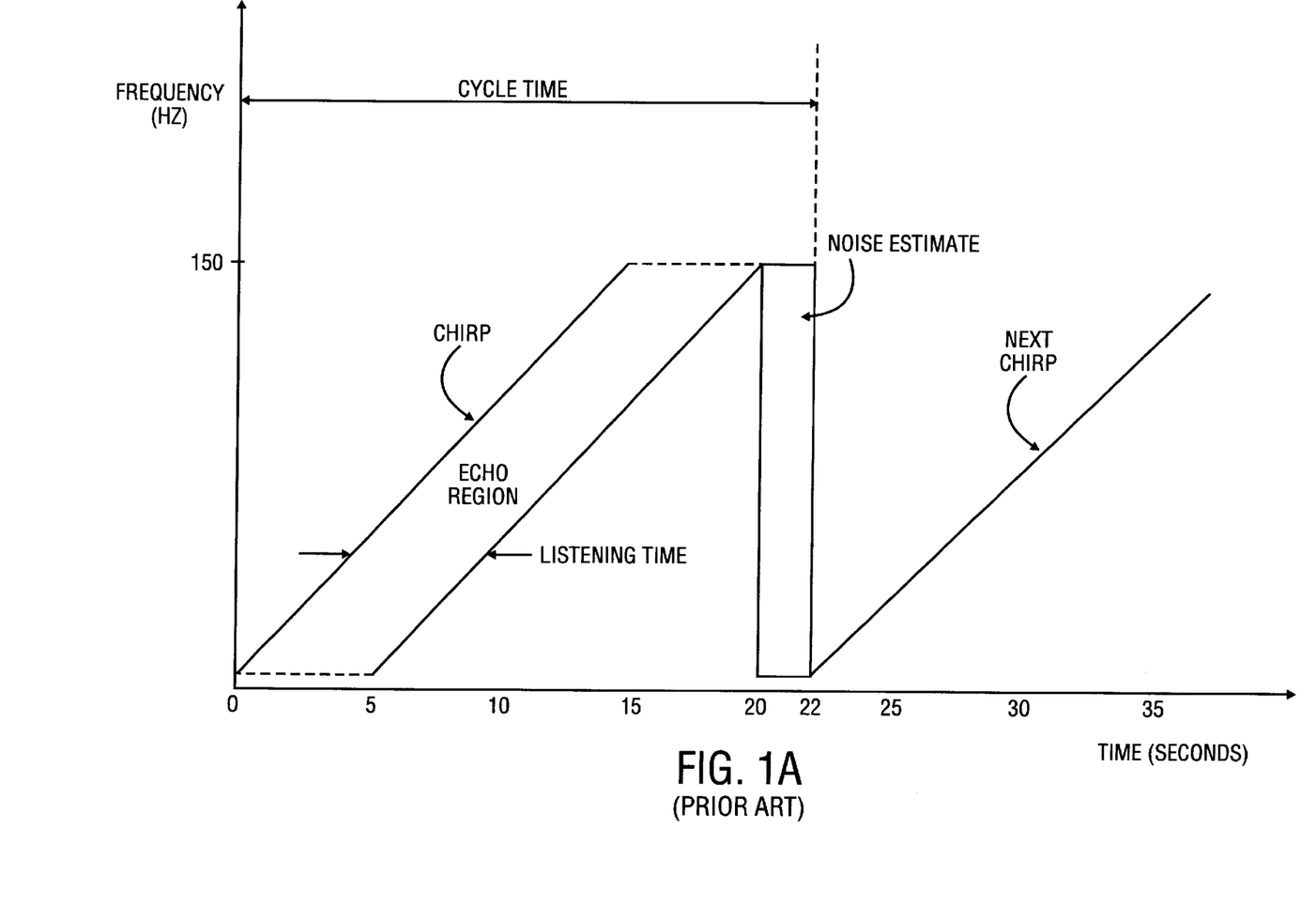
FIG. 1A illustrates a prior art sequential sweep operation that uses a broad band energy detector to estimate noise energy.

FIG. 1A illustrates a prior art sequential sweep operation that uses a broad band energy detector to measure the total noise energy across the entire frequency band of interest. The broad band noise estimation occurs in between the end of a prior listening region and the start of a new chirp sweep. One problem with such a system is that in order to obtain an accurate noise estimate, a dead time (e.g., 2 seconds shown) when no sweeps occur is necessary for broad band energy detection. The deadtime for noise estimation adds to the overall cycle time of seismic surveying operations.

For example, as illustrated in FIG. 1A, a single chirp sweep (15 seconds), plus listening time (5 seconds), plus noise estimation (2 seconds) may take 22 seconds. If 1000 VPs are made in a day, then approximately 33 minutes are used in a non-productive mode listening for noise. Assuming a 12 hour working day, this translates to approximately 5% of the available work time used for noise estimation.

Figure 1B:
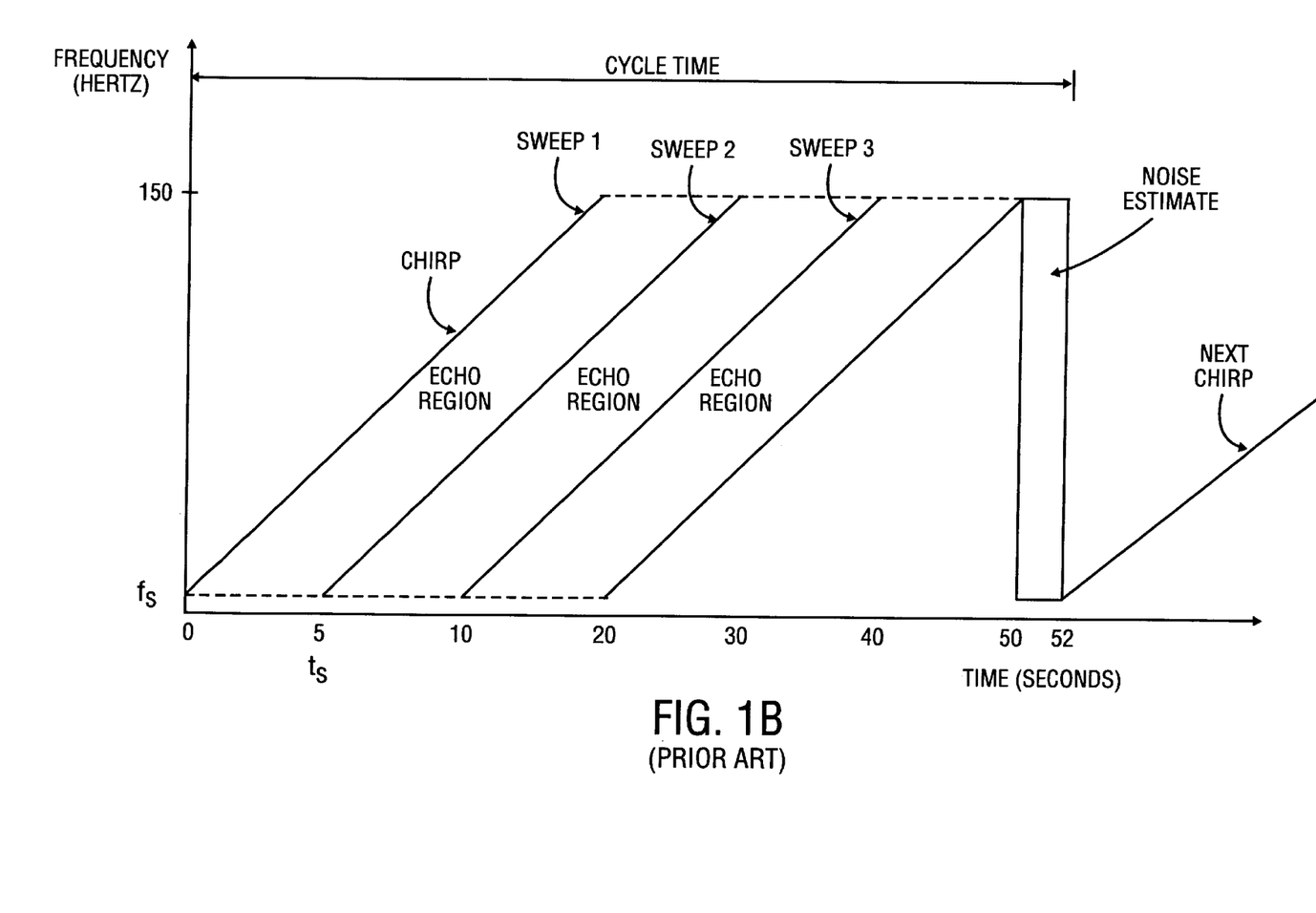
FIG. 1B illustrates a prior art slip sweep operation that uses a broad band energy detector to estimate noise energy.

FIG. 1B illustrates a prior art slip sweep operation that also uses a broad band energy detector to measure noise energy. In slip sweep operations, multiple groups of vibroseis trucks are used in which a group starts sweeping without waiting for the other groups' sweep to be completed. The sweeps of the different groups occur in non-overlapping frequency-time windows such that no two groups are sweeping in the same frequency at the same time. For example, sweep 2 from a second group is started at time, ts, as soon as the start frequency, fs, of the previous sweep 1's echo region has completed.

As with sequential sweep operations, a slip sweep operation using a broad band noise estimator requires a dead time (e.g., 2 seconds shown) when no sweeps occur for broad band energy detection in order to obtain an accurate noise estimate. The noise estimate occurs in between the end of the last echo region of a vibroseis group's sweeps and the start of a new chirp sweep in a new vibroseis group's sweeps. One problem with using a broad band noise estimator is that the operations of all vibroseis groups must stop in order to obtain the noise estimate, thereby adding to the overall cycle time of seismic surveying operations.

SUMMARY OF THE INVENTION

The present invention pertains to a method and apparatus for noise estimation. The method including producing a first chirp signal having a varying frequency over a first time period, sampling noise energy at a frequency different than the first chirp signal frequency during the first time period, and generating a noise estimate based on the noise energy sampled.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, numerous specific details are set forth such as examples of specific times, frequencies, process steps, components, etc. in order to provide a thorough understanding of the present invention. It will be apparent, however, to one skilled in the art that these specific details need not be employed to practice the present invention. In other instances, well known circuits or methods have not been described in detail in order to avoid unnecessarily obscuring the present invention.

A noise estimation system and method wherein noise is sampled approximately concurrent with chirp signal sweeps are described. In one embodiment, the noise estimation circuit and method described herein may be implemented with a seismic surveying operation. When used with a seismic surveying operation, the cycle time of seismic surveying operations may be reduced by providing for noise estimation without adding deadtime to the surveying operations. It should be noted, however, that the present invention is described in relation to a seismic surveying only for illustrative purposes and is not meant to be limited to noise estimates in seismic surveying as the present invention may be applied to other frequency variant signal environments.

In a typical surveying operation, a group of vibroseis trucks proceeds to a vibrator point (VP) and each truck lowers a pad used to generate a chirp sweep. The trucks sweep chirp signals, wait for the end of the listening period, and sweep again. This procedure is repeated until the requisite number of sweeps for the VP is completed. The vibroseis trucks in the group then lift their pads, move to the next point, and repeat the sequence at the new VP. In order to obtain an in-field estimate of the data quality, a passive measurement of the ambient noise level is made. If the ambient noise level is too high, then surveying operations may have to be halted until the ambient noise level falls to an acceptable SNR level.

Figure 2A:
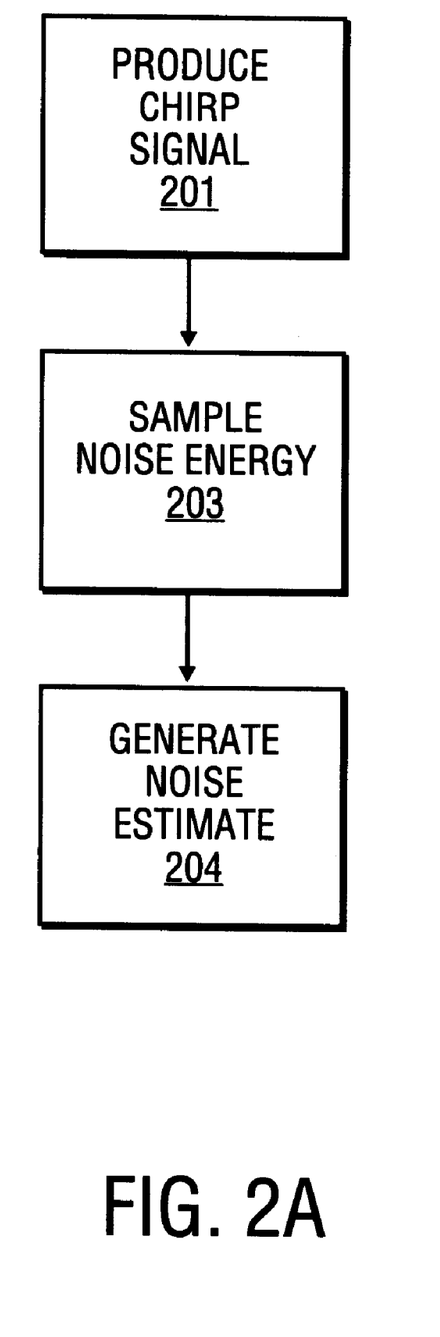
FIG. 2A is a flow diagram illustrating one embodiment of a noise estimation scheme.

FIG. 2A is a flow diagram illustrating one embodiment of a noise estimation scheme. The noise estimation scheme described herein may be used to perform noise measurement in a time interval that is approximately concurrent with a time interval that a chirp signal is transmitted. A chirp signal having a swept frequency during a first time period is produced, step 201. Noise energy is sampled during the same time period but at a different frequency than the chirp sweep at any given point in the time period, step 203.

In one embodiment, a desired signal is monitored during a listening period. The chirp sweep and listening period occur in the same time period as the noise measurement but at frequencies that are offset from the noise measurement frequency. As such, noise energy is sampled during the same time period but at a different frequency than the chirp sweep at any given point in the time period. In this manner, the noise measurements may be performed while the chirp sweep and listening periods are proceeding. A noise estimate may be generated based on the noise measurements, step 204.

Figure 2B:
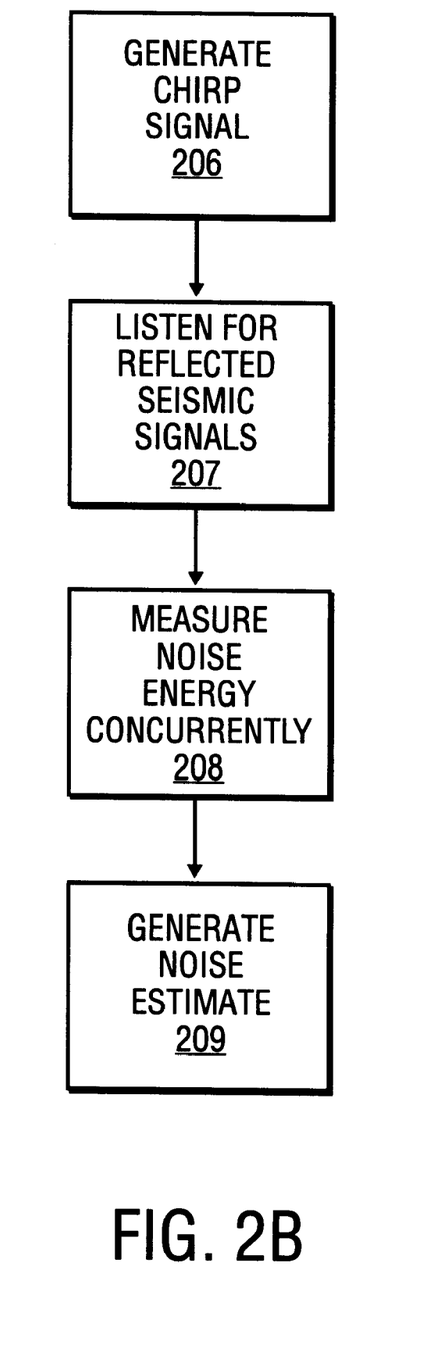
FIG. 2B is a flow diagram illustrating another embodiment of a noise estimation scheme.

FIG. 2B is a flow diagram illustrating another embodiment of a noise estimation scheme. In one embodiment, a chirp signal having an increasing frequency in a time period is generated, step 206. The frequency is increased within a frequency range having a start frequency and an end frequency. Reflected seismic signals are listened for in the same frequency range as the chirp signal transmission, step 207. The listening time period for the reflected signals is approximately concurrent with the chirp signal generation time period, but with an end time that is offset from the end time of the chirp signal generation by a predetermined amount. A subsequent predetermined time after the start time of the listening period, noise energy measurement is initiated beginning at the same start frequency as the chirp signal, step 208.

In this manner, the noise energy measurements are made in the same frequency range and approximately concurrent with the chirp signal sweep; however, during any given point in time, noise is measured in a frequency range different than the frequency of the chirp signal and the frequencies of the echoes. A noise estimate is then generated based on the sampled noise energy, step 209. It should be noted that the frequencies and times used in the embodiments described herein are for illustrative purposes only, and that other frequencies and times may be used.

Figure 2C:
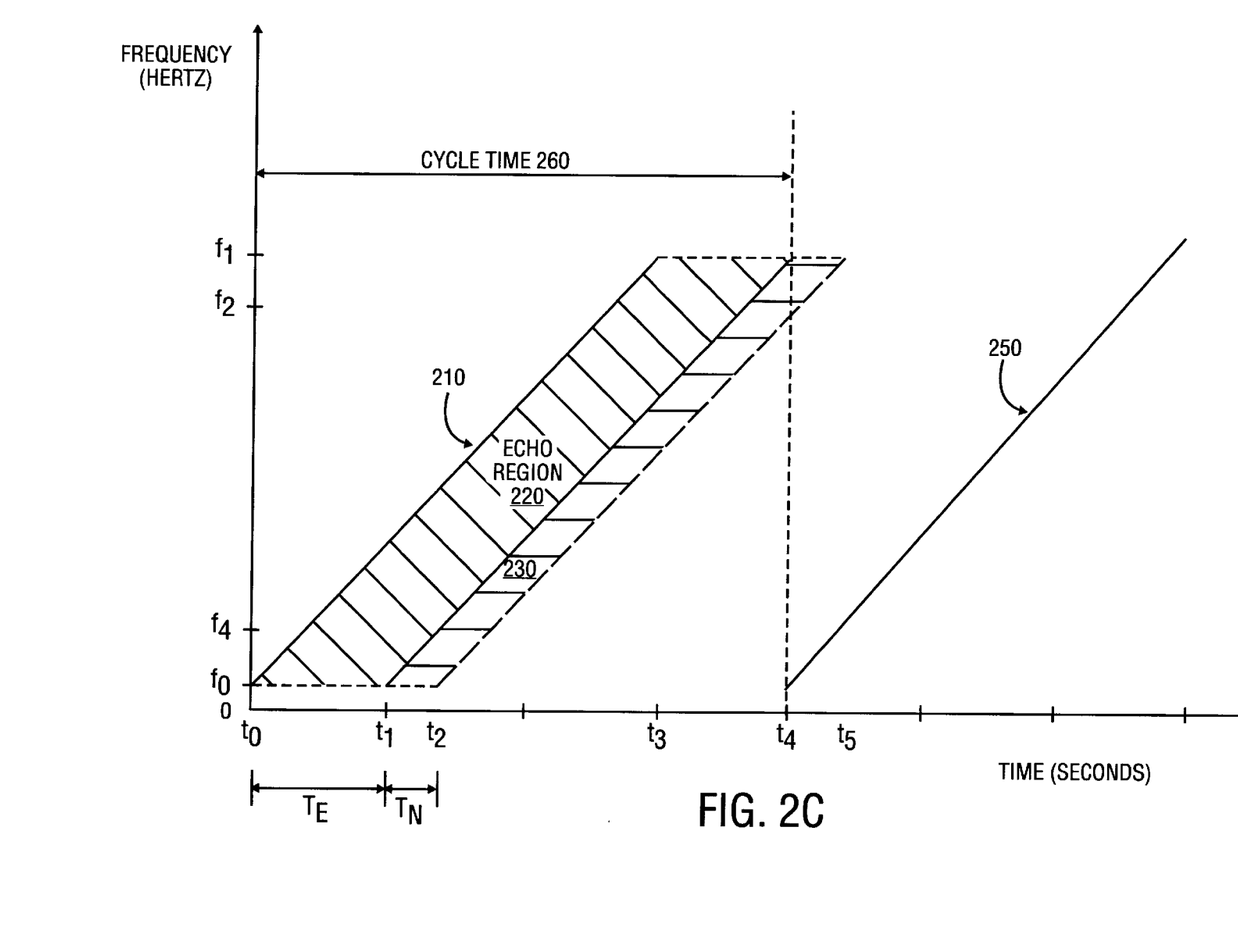
FIG. 2C illustrates a frequency-time spectrum of vibroseis operation according to one embodiment of a noise estimation scheme.

FIG. 2C illustrates a frequency-time spectrum of vibroseis operation according to one embodiment of a noise estimation scheme. Chirp signal 210 is an acoustic energy wave that is linearly increased in frequency from $f_0$ to $f_1$ over a period of time from $t_0$ to $t_3$. In one embodiment, for example, chirp signal 210 has a frequency that is linearly increased from 5 to 150 Hertz (Hz) during a 15 second time period. Echoes returning to the surface will be delayed by the travel time through the subterranean layers. The earliest received echo will be from the shallowest layer and will have a frequency content corresponding to the lowest chirp frequency $f_0$. The listening time may start immediately after the start $t_0$ of chirp signal 210 with echoes being received out to a time $t_1$ corresponding to the travel time of the acoustic waves to and from the deepest layers of interest. The listening time window has a predetermined time interval Te that the seismic detectors will listen for a given frequency resulting in echo region 220. In one embodiment, a broad band filter is used to screen the reflected waves in echo region 220 between $f_0$ and $f_1$ until time $t_4$.

Passive noise estimation 230 is performed using a sliding time-variant narrow band filter in a frequency-time domain 230 that is delayed with respect to chirp signal 210 and echo region 220. In one embodiment, the narrow band filter is a bandpass filter. In another embodiment, the narrow band filter is a combination of a high pass filter and a low pass filter.

The noise measurement begins at a time just after the end of the listening time period $t_1$ for frequency $f_0$ and lasts for a predetermined time Tn, until time $t_2$. The frequency at which noise energy is measured is delayed with respect to echo region 220 and linearly increases at a rate equal to or less than the rate of the chirp sweep so that noise measurement in one frequency band may be performed while a chirp is sweeping in a different frequency band. In this manner, noise estimation may be performed concurrently with sweep operations because the frequency-time domain of noise measurement region 230 is outside echo region 220. Furthermore, a new chirp signal 250 may be started as soon as the listening period of the first chirp signal 210 ends, at time $t_4$. The new chirp signal 250 may begin at time $t_4$ even though noise measurement is still in progress, because the time-variant narrow band filter has been swept to evaluate noise in a frequency range $f_2$ to $f_1$ while new chirp signal 250 is being swept at the frequency range $f_0$ to $f_4$ in the same time period $t_4$ to $t_5$.

Using the sliding time-variant narrow band filter described herein eliminates the deadtime required when using a broad band noise estimator functioning outside of a sweep and listening time period. By performing noise estimation during a sweep and listening period, the time between consecutive sweeps (cycle time 260) may be reduced because a new sweep may begin immediately after the end of a prior sweep. Therefore, the total cycle time of surveying operations may be reduced.

For example, if chirp signal 210 has a sweep time of 15 seconds ($t_3$=15 seconds), a listening sweep time of 5 seconds ($t_4-t_3=5$ seconds), and a noise estimation sweep time of 2 seconds ($t_5-t_4=2$ seconds), then cycle time 260 is only 20 seconds ($t_4=20$ seconds). This is approximately a 9% reduction in cycle time from the 22 second cycle time of operations using the prior art noise estimation technique shown in FIG. 1A.

Figure 3:
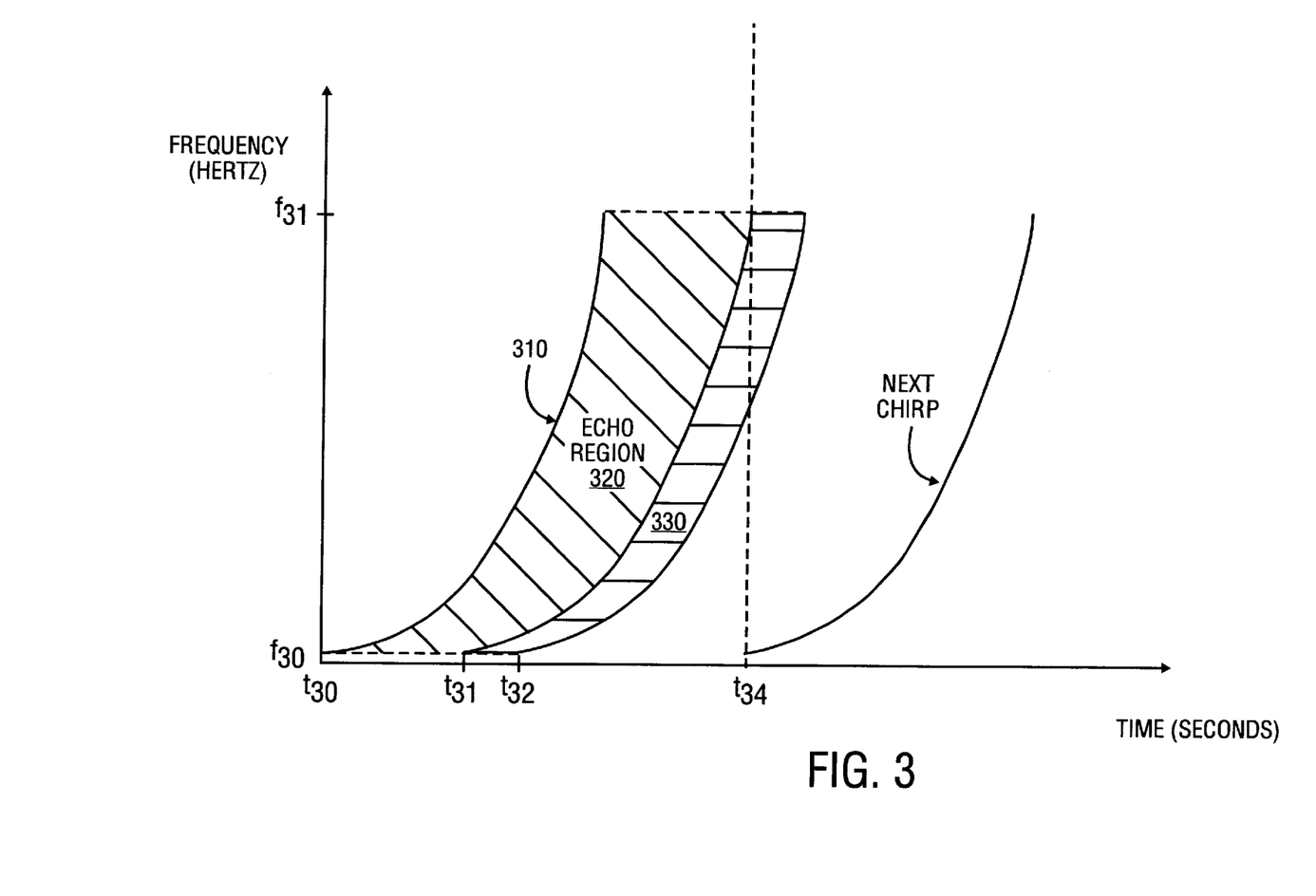
FIG. 3 illustrates a frequency-time spectrum of vibroseis operation according to another embodiment of a noise estimation scheme.

It should be noted that although FIG. 2C illustrates chirp signal 210 and echo region 220 with a linearly increasing frequency over time, the chirp signal and listening region may also be linearly decreased with the noise region 230 correspondingly varied. In an alternative embodiment, the frequencies of the chirp signal 310, echo region 320, and noise region 330 may be varied over time in other manners, for example, exponentially as illustrated in FIG. 3. It should also be noted that noise estimation scheme described herein may also be used in slip sweep operations as shown in FIG. 4.

Figure 4:
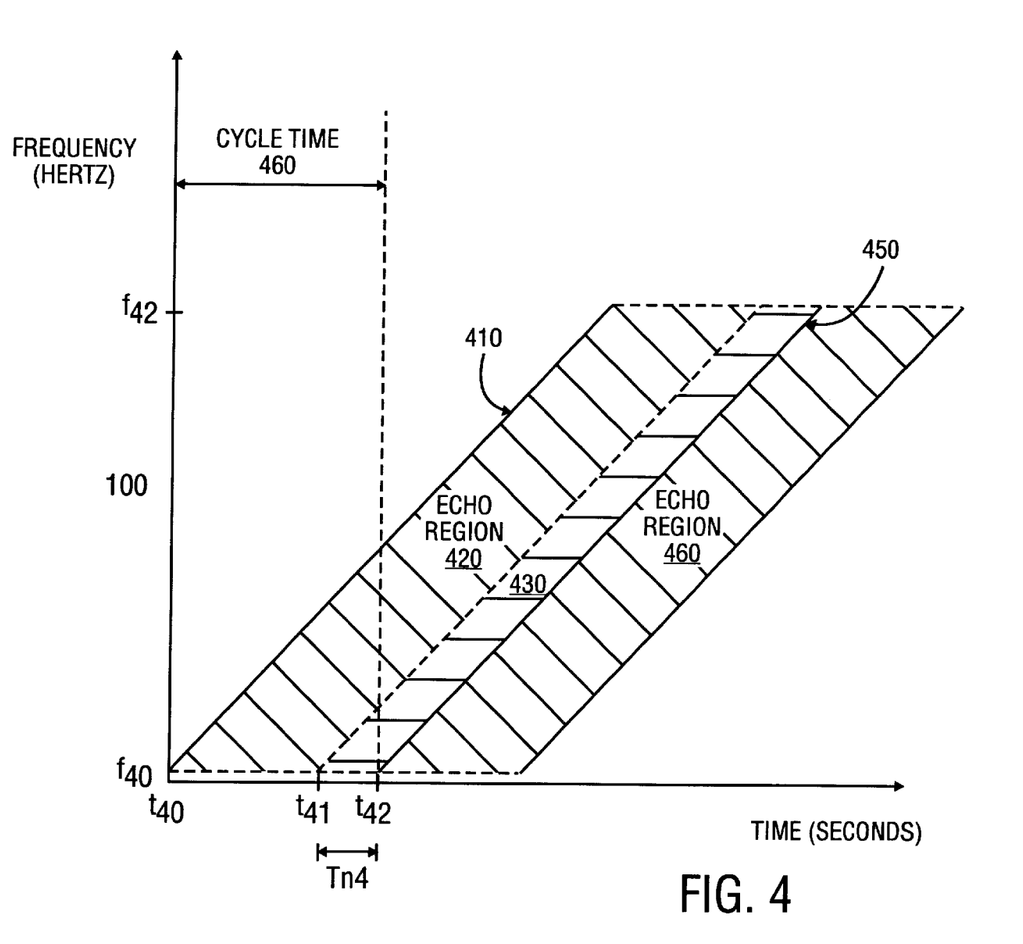
FIG. 4 illustrates one embodiment of a noise estimation scheme in slip sweep operations.

FIG. 4 illustrates one embodiment of noise estimation in slip sweep operations. In slip sweep operations, multiple groups of vibroseis trucks sweep in non-overlapping frequency-time windows such that different groups are not sweeping in the same frequency at the same time. Noise measurement in noise region 430 is performed using a sliding time variant narrow band filter in a frequency-time domain that is delayed with respect to chirp signal 410 and echo region 420. In one embodiment, the narrow band filter may be a bandpass filter. In another embodiment, the narrow band filter may be a combination of a high pass filter and a low pass filter.

The noise measurement for frequency $f_{40}$ of noise region 430 begins at a time just after the end of the echo region (listening time period) $t_{41}$ and lasts for a predetermined time $Tn_4$, until time $t_{42}$. The frequency for which noise measurement is performed may be delayed in time with respect to the frequencies received in echo region 420 and may be linearly increased at a rate approximately equal to the rate of chirp 410. This allows noise measurement to be performed concurrently with the listening period defined by echo region 420. The overlapping duration of the echo region and the noise measurement is possible because the noise for any given frequency is measured at time delayed from the receipt of reflected seismic waves for the same frequency. In another embodiment, the frequency at which noise measurement is performed may be linearly increased at a rate less than the rate of chirp 410.

A chirp signal 450 for a subsequent vibroseis truck group is started at frequency $f_{40}$ at $t_{42}$ as soon as the time period $Tn_4$ for noise measurement at frequency $f_{40}$ has ended. A time variant sliding narrow band filter may be used to separate chirp signals 410 and 450. In this manner, noise estimation may be performed because the frequency-time domain of noise measurement region 430 is outside of chirp signal 410, echo region 420, chirp signal 450, and the echo region 460 for chirp signal 450. It should be noted that the frequency of the chirp signal sweeps and the corresponding noise measurements in slip sweep operations may also be non-linearly varied with time, for example, exponentially.

Figure 5A:
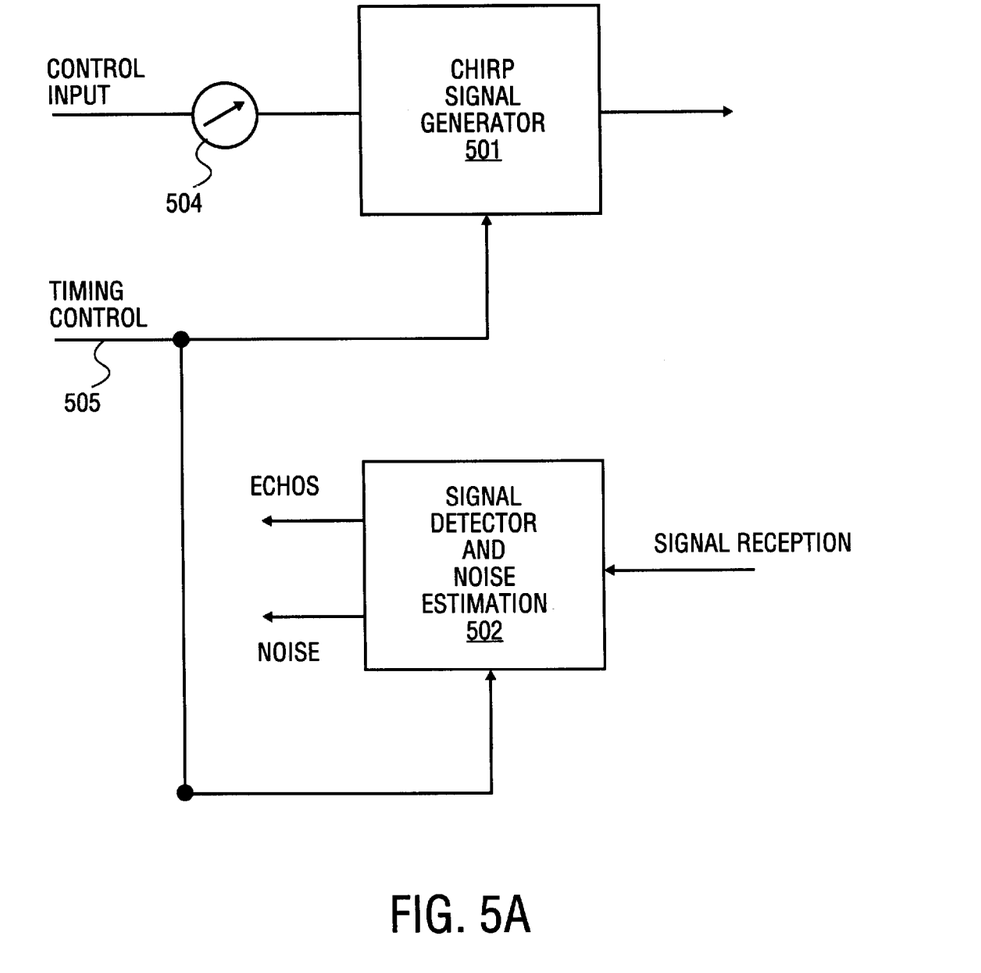
FIG. 5A illustrates a system utilizing one embodiment of a noise estimation scheme.

FIG. 5A illustrates a system utilizing one embodiment of a noise estimation scheme. The system includes a chirp signal generator 501, and a signal detector and a noise estimation circuit 502. The chirp signal generator 501 has a control input 504 that is used to generate a frequency swept signal over time. In one embodiment, timing control 505 can be used to synchronize the operation of chirp signal generator 501 with signal detector and noise estimation circuit 502. The detector 502 includes input circuitry to detect acoustic energy and generate internal signals having frequency components to be used by a frequency filter.

Figure 5B:
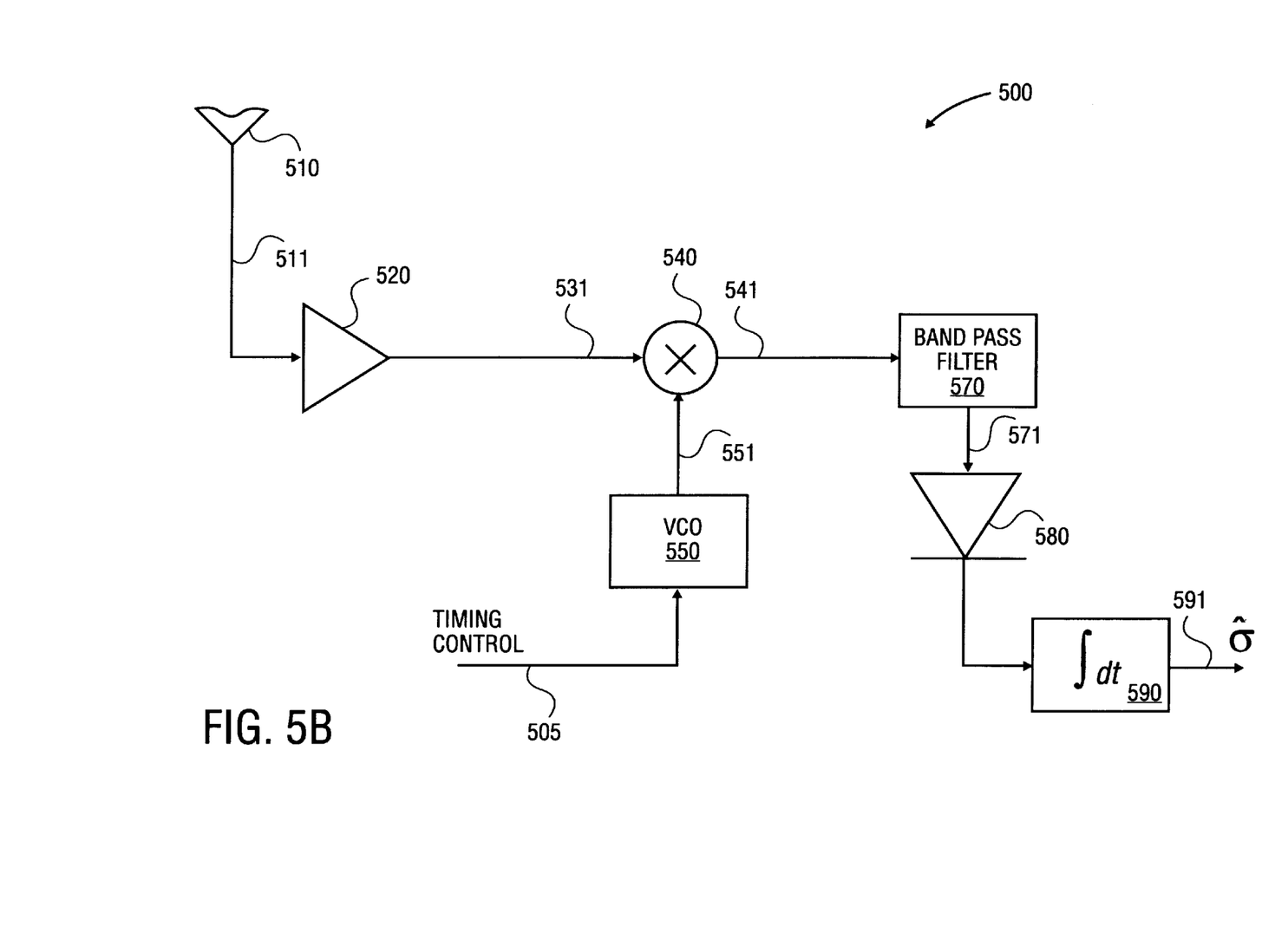
FIG. 5B illustrates one embodiment of a noise estimator.

FIG. 5B illustrates one embodiment of a noise estimator. The noise estimator 500 is used to measure noise concurrently with sweeping operations and generate a noise estimate. The noise estimate may be used to determine if sweeping operations should be halted until the ambient noise falls to allow for clear reception of echoes. In one embodiment, the noise measurements include reflections from subterranean layers deeper than those of interest.

In one embodiment, noise estimator 500 includes a geophone 510, an amplifier 520, a mixer 540, a voltage controlled oscillator (VCO) 550, a bandpass filter 570, a rectifier 580, and an integrator ($\int dt$) 590. It should be noted that a geophone, an amplifier, a mixer, a VCO, a bandpass filter, a rectifier, and an integrator are well known in the art; accordingly, a detailed description of their internal components and their operation is not provided herein.

The noise estimator 500 calculates an estimate of the noise energy based on the noise measurements made throughout the frequency range of operation. Acoustic energy waves of noise are received at geophone 510 and converted into an analog electrical signal 511 that characterizes the magnitude and frequency content of the acoustic energy waves. The electrical signal 511 is amplified by amplifier 520 and transmitted to mixer 540. The output 531 of amplifier 520 is combined with VCO 550 output signal 551 by mixer 540. VCO 550 is used to slide signal 531 so that noise estimation can be performed at different frequencies while keeping the band range of bandpass filter 570 fixed. Bandpass filter 570 is used to screen out frequencies, in a particular time domain, for which noise measurement is not desired. In one embodiment, bandpass filter 570 may remove unwanted negative signal images from previous lower frequencies that have been shifted up into a higher frequency range.

In one embodiment, for example, the chirp signal is swept in frequency from 10 Hz to 150 Hz while the frequency of VCO 550 is decreased from 390 Hz to 250 Hz. By mixing the amplified sensor signal 531 with output signal 551 of VCO 550, the output 541 of mixer 540 will have approximately a constant frequency of 400 Hz. The mixer difference frequencies between the chirp signal and the VCO range from 380 Hz to 100 Hz. As such, bandpass filter 570 may be selected to have a bandpass frequency centered at 400 Hz with approximately a +/−20 Hz bandwidth in order to filter out these mixer difference frequencies.

In an alternative embodiment, the signal representing the acoustic energy waves of noise is fixed and the band range of bandpass filter 570 is adjusted based on a sliding time. The VCO 550, mixer 540, and filter 570 are replaced with a tunable digital bandpass filter having taps that are changeable based on a run time.

Figure 6:
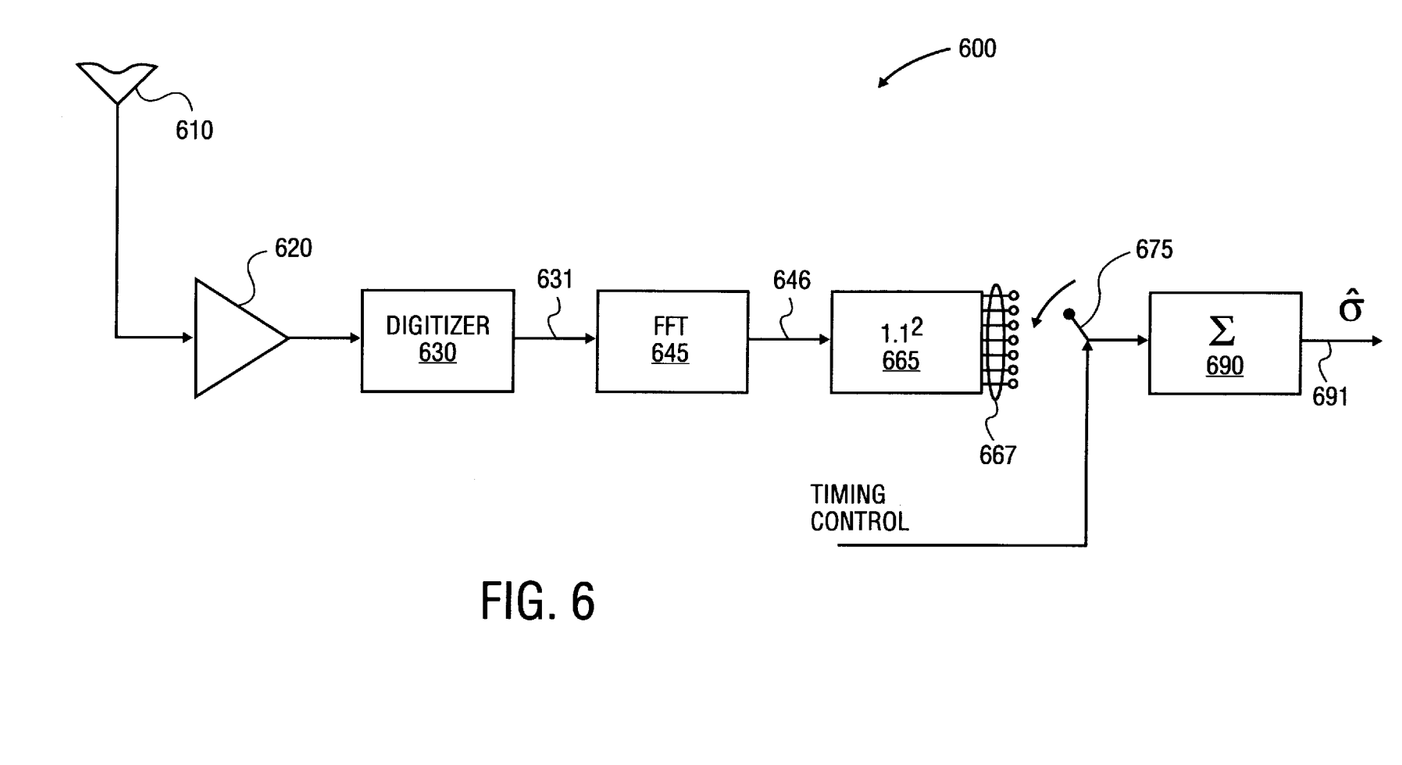
FIG. 6 illustrates another embodiment of a noise estimator.

FIG. 6 illustrates another embodiment of a noise estimator. In this embodiment, noise estimator 600 includes a geophone 610, an amplifier 620, a digitizer 630, a fast fourier transform circuit (FFT) 645, a complex conjugate multiplier circuit 665, a multiplexer 675, and a digital summation circuit 690. It should be noted that a geophone, an amplifier, a digitizer, a fast fourier transform circuit, a complex conjugate multiplier circuit, a multiplexer, and a digital summation circuit are well known in the art; accordingly, a detailed description of their internal components and their operation is not provided herein.

The digital signal characterizing the magnitude and frequency content of the noise energy is applied to FFT 645.

FFT 645 functions as a bank of narrow band filters and generates an output 646 in the form of a complex number. The magnitude of output 646 is squared 665 to generate an estimate of the power spectral density. A multiplexer 675 is used to select from among the different frequency bins 667 of the power spectral density. The output of the multiplexer 675 is applied to digital summation circuit 690 to generate the noise estimate 691.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of generating a noise estimate during seismic surveying, comprising the steps of:

measuring noise energy having a plurality of frequencies in a second time interval, the second time interval having a second start time delayed from a first start time of a first time interval during which a first plurality of reflected seismic signals are present, the plurality of reflected seismic signals having the plurality of frequencies, the second time interval approximately concurrent with the first time interval to measure one of the plurality of frequencies of the noise energy different than one of the plurality of frequencies of the first plurality of reflected seismic signals that are present; and generating a noise estimate based on the noise energy measured.

2. The method of claim 1, further comprising the step of:

receiving the first plurality of reflected seismic signals having the plurality of frequencies in a frequency range of a generated first seismic signal, the first plurality of reflected seismic signals received in the first time interval.

3. The method of claim 2, wherein the step of measuring comprises measuring a lower frequency of the noise energy than one of the plurality of frequencies of the reflected seismic signals present at the same time.

4. The method of claim 3, further comprising the steps of:

measuring the plurality of frequencies of the reflected seismic signals at a first frequency that is linearly increased at a first rate based on the first time interval; and measuring the noise energy at a second frequency that is linearly increased at a second rate based on the second time interval.

5. The method of claim 4, wherein the second rate is less than or equal to the first rate.

6. The method of claim 3, further comprising the steps of:

measuring the plurality of frequencies of the reflected seismic signals at a first frequency that is exponentially increased at a first rate based on the first time interval; and measuring the noise energy at a second frequency that is exponentially increased at a second rate based the second time interval.

7. The method of claim 6, wherein the second rate is less than or equal to the first rate.

8. The method of claim 2, wherein a plurality of second reflected seismic signals having the plurality of frequencies are present during a third time interval, the third time interval having a third start time delayed from the second start time, the third time interval concurrent with the second time interval.

9. The method of claim 8, wherein the step of measuring comprises measuring a lower frequency of the noise energy than one of the plurality of frequencies of the reflected seismic signals and measuring a higher frequency than one of the plurality of second reflected seismic signals present at the same time.

10. A method of noise measurement, comprising the steps of:

receiving a reflected seismic signal having a first frequency in a frequency range, the reflected seismic signal received at a first time;

measuring noise energy at a second frequency approximately concurrent with receiving the reflected seismic signal having the first frequency; and measuring the noise energy at the first frequency in the frequency range, the noise energy at the first frequency measured at a second time delayed from the first time.

11. The method of claim 10, further comprising the steps of:

receiving additional reflected seismic signals having other frequencies in the frequency range based on a first time interval; and measuring noise energy at the other frequencies in the frequency range based on a second time interval, the second time interval delayed with respect to the first time interval.

12. The method of claim 11, wherein the other frequencies increase linearly with increasing time.

13. The method of claim 11, wherein the other frequencies increase exponentially with increasing time.

14. The method of claim 10, further comprising the step of:

receiving a new reflected seismic signal having a third frequency in the frequency range, the new reflected seismic signal received at a third time delayed from the second time, the new reflected signal received simultaneous with receiving the reflected seismic signal having the first frequency and measuring the noise energy at the second frequency.

15. A noise estimator circuit, comprising:

an input circuit configured to detect acoustic noise energy and provide input signals having frequency components;

a tunable bandpass filter coupled to receive the input signals, the tunable bandpass filter configured to pass as an output certain frequency components of the input signals based on a variable time; and a summation circuit coupled to the tunable bandpass filter to generate a noise value based on the output of the tunable bandpass filter.

16. The noise estimator circuit of claim 15, wherein the input circuit comprises:

a geophone coupled to receive the acoustic noise energy and convert the acoustic energy into analog electrical signals; and a digitizer coupled to receive the analog electrical signals, the digitizer converting the analog electrical signals into digital signals having the frequency components.

17. The noise estimator circuit of claim 16, wherein the summation circuit is a digital circuit and wherein the tunable bandpass filter is a digital circuit coupled to receive the digital signals from the digitizer.

18. The noise estimator circuit of claim 17, wherein the tunable bandpass filter comprises:
   a FFT coupled to the input circuit;
   a multiplier circuit coupled to the FFT; and
   a multiplexer coupled to the multiplier circuit.

19. The noise estimator circuit of claim 15, wherein the summation circuit is an integrator, and wherein the tunable bandpass filter comprises:
   a mixer having a first input, a second input, and an output, the first input of the mixer coupled to receive the input signals of the input circuit;
   a voltage controlled oscillator coupled to the second input of the mixer;
   a bandpass filter having an input and an output, the input of the bandpass filter coupled to the output of the mixer; and
   a rectifier having an input and an output, the input of the rectifier coupled to the output of the bandpass filter, the output of the rectifier coupled to the integrator.

20. A noise estimator circuit, comprising:
   a first narrow band filter configured to receive reflected seismic signals having a plurality of frequencies; and
   a second narrow band filter configured to receive noise energy having the plurality of frequencies, the noise energy received in a second time interval in a lower frequency range than the reflected seismic signals received in a first time interval, the first time interval approximately concurrent with the second time interval,
   the first and the second narrow band filters variable to filter higher frequencies as the first and the second time intervals are increased.

21. The noise estimator circuit of claim 20, wherein the first and the second narrow band filters are approximately linearly variable to filter higher frequencies with increasing time.

22. The noise estimator circuit of claim 20, wherein the first and the second narrow band filters are approximately exponentially variable to filter higher frequencies with increasing time.

* * * * *